US011692361B2

(12) United States Patent
Villarreal, III et al.

(10) Patent No.: US 11,692,361 B2
(45) Date of Patent: Jul. 4, 2023

(54) AIRCRAFT INTERNAL HANGING SCAFFOLD

(71) Applicant: The Boeing Company, Chicago, IL (US)

(72) Inventors: Jose Villarreal, III, Snohomish, WA (US); Jeffrey Robert Hillis, Everett, WA (US); Steven Edwin May, Everett, WA (US); Robert Tyler Sharp, Marysville, WA (US)

(73) Assignee: The Boeing Company, Chicago, IL (US)

( * ) Notice: Subject to any disclaimer, the term of this patent is extended or adjusted under 35 U.S.C. 154(b) by 801 days.

(21) Appl. No.: 16/589,493

(22) Filed: Oct. 1, 2019

(65) Prior Publication Data
US 2021/0095483 A1    Apr. 1, 2021

(51) Int. Cl.
| | | |
|---|---|---|
| *E04G 7/14* | (2006.01) |
| *E04G 5/04* | (2006.01) |
| *B64C 1/10* | (2006.01) |
| *B64F 5/10* | (2017.01) |
| *E04G 5/10* | (2006.01) |
| *E04G 5/14* | (2006.01) |

(52) U.S. Cl.
CPC ............... *E04G 5/045* (2013.01); *B64C 1/10* (2013.01); *B64F 5/10* (2017.01); *E04G 7/14* (2013.01); *E04G 5/10* (2013.01); *E04G 5/14* (2013.01)

(58) Field of Classification Search
CPC . B64F 5/10; E04G 65/045; E04G 5/10; E04G 5/14; E04G 7/14; E04C 1/10
See application file for complete search history.

(56) References Cited

U.S. PATENT DOCUMENTS

| | | |
|---|---|---|
| 2002/0139614 A1 | 10/2002 | Volkman |
| 2003/0146005 A1 | 8/2003 | Brooke et al. |
| 2006/0175130 A1* | 8/2006 | Riley ................. E04G 5/00 182/82 |
| 2012/0282013 A1 | 11/2012 | Beland |

FOREIGN PATENT DOCUMENTS

| | | |
|---|---|---|
| CA | 721647 A | 11/1965 |
| DE | 29704231 U1 | 5/1997 |
| EP | 3367196 A1 | 8/2018 |
| FR | 3029550 A1 | 6/2016 |
| KR | 20130000512 U | 1/2013 |

OTHER PUBLICATIONS

European Patent Office Extended Search Report, dated Jan. 13, 2021, regarding Application No. 20187964.0, 12 pages.
European Patent Office Examination Report, dated Aug. 24, 2022, regarding Application No. 20187964.0, 6 pages.

* cited by examiner

*Primary Examiner* — Nirvana Deonauth
(74) *Attorney, Agent, or Firm* — Yee & Associates, P.C.

(57) ABSTRACT

A method and apparatus for assembling a hanging scaffold system within the aft pressure bulkhead area of an aircraft to provide access to the pressure dome without contacting the pressure dome. The hanging scaffold system comprises a group of horizontal supports to support at least one floorboard. A group of vertical supports is connected to and extends perpendicularly from the group of horizontal supports. A clamping device is attached to each vertical support of the group of vertical supports and further engages an attachment point on an internal structure of an aircraft.

21 Claims, 11 Drawing Sheets

AIRCRAFT INTERNAL HANGING SCAFFOLD

STATEMENT OF GOVERNMENT INTEREST

This invention was made with United States Government support under Contract No. FA8625-11-C-6600 awarded by Department of Defense. The United States Government has certain rights in this invention.

BACKGROUND INFORMATION

1. Field

The present disclosure relates generally to aircraft manufacture and maintenance, and in particular, to providing stable access to the aft pressure bulkhead area of the aircraft during assembly and maintenance without interfering with the pressure dome.

2. Background

Aft pressure bulkheads are the primary structure members which combined with a fuselage or cabin provide a sealed pressure vessel and carry the aft pressure loads when the cabin is pressurized. Aft pressure bulkheads are comprised of a bulkhead outer ring attached to the internal structure of the aircraft and a dome shaped shell attached to the bulkhead outer ring. During initial build and during regularly scheduled maintenance, closeout on the seal fittings of the aft pressure bulkhead area is required. Access to the bulkhead is limited within the aircraft and any tools required for assembly and maintenance must be capable of fitting through a small hatch in the fuselage of the aircraft. The entire circumference of the dome shaped shell is not easily accessed in a safe manner. The overall height of the aft pressure bulkhead area is typically greater than the average human user and thus steps, platforms, and ladders are typically required to access the entire bulkhead area.

Currently access to the aft pressure bulkhead area of the aircraft during assembly and maintenance is provided by built-in steps and/or platforms and removable ladders. Ladders or stools are secured to the steps or platforms to allow a user to access the upper regions of the pressure dome. Often the ladder may rest, lean, or be propped against the dome shaped shell risking damage to the pressure dome and providing a stability issue for the user on the ladder. Further, the individual ladders are required to be strapped or braced, often at odd angles, where injury risk is high and mobility of the user is limited.

Therefore, it would be desirable to have a method and apparatus that take into account at least some of the issues discussed above, as well as other possible issues. For example, it would be desirable to have a method and apparatus that provides access to the aft pressure bulkhead while providing a safe environment for the user and not jeopardizing the integrity of the pressure dome.

SUMMARY

An example of the present disclosure provides an apparatus comprising a group of horizontal supports to support at least one floorboard. The apparatus also includes a group of vertical supports connected to and extending perpendicularly from the group of horizontal supports. The apparatus also includes a clamping device attached to each vertical support of the group of vertical supports. The apparatus also includes where the clamping device is configured to engage an attachment point on an internal structure of an aircraft.

Another example of the present disclosure provides a hanging scaffold system for attachment to an internal structure of an aircraft comprising a group of clamping devices configured to be attachable to the internal structure of the aircraft. The hanging scaffold system also includes a group of vertical supports connected to the group of clamping devices. The hanging scaffold system also includes a group of horizontal supports connected to the group of vertical supports. The hanging scaffold system also includes a group of floorboards supported by the group of horizontal supports.

Yet another example of the present disclosure provides a method for attaching a hanging scaffold system to an internal structure of an aircraft comprising attaching a group of clamping devices to a curved surface of the internal structure of the aircraft. The method also includes connecting a group of vertical supports to the group of clamping devices. The method also includes connecting a vertical support of the group of vertical supports to another vertical support of the group of vertical supports with a diagonal crossbar. The method also includes connecting a group of horizontal supports to the group of vertical supports on an end of each vertical support of the group of vertical supports opposite the group of clamping devices. The method also includes connecting an outrigger assembly to the group of horizontal supports and further attaching the outrigger assembly to the internal structure of the aircraft. The method also includes installing a group of floorboards on the group of horizontal supports.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of an illustrative example of the present disclosure when read in conjunction with the accompanying drawings, wherein:

DETAILED DESCRIPTION

The illustrative examples recognize and take into account one or more different considerations. For example, the illustrative examples recognize and take into account that it would be desirable to have a hanging scaffold system that is configurable to be attached to an internal structure of an aircraft. The hanging scaffold system may be suspended from the internal frame of the aircraft structure. Further, the hanging scaffold system, when disassembled may comprise pieces configured to all fit through the hatch of the aircraft that leads to the pressure bulkhead area. Still further, the dissembled pieces of the hanging scaffold system can be moved into and assembled and disassembled in the pressure bulkhead area by a single user.

The illustrative examples recognize and take into account that it would be desirable to have a hanging scaffold system that is configurable to be attached to the internal structure of the aircraft with a group of clamping devices where the hanging scaffolding system is configured to provide a walking deck and support up to at least 600 lbs.

As used herein, "a group of", when used with reference to items, means one or more items. For example, "a group of clamping devices" is one or more clamping devices.

Thus, the illustrative examples provide a hanging scaffold system for providing a raised, stable platform such that a user can reach the entirety, and especially the upper region, of the pressure bulkhead area during assembly and maintenance of the pressure bulkhead area without contact with the pressure dome and jeopardizing the integrity of the pressure dome. The raised stable platform of the illustrative examples further provides a walking deck and safety from loose ladders and high fall hazards.

Figure 1:
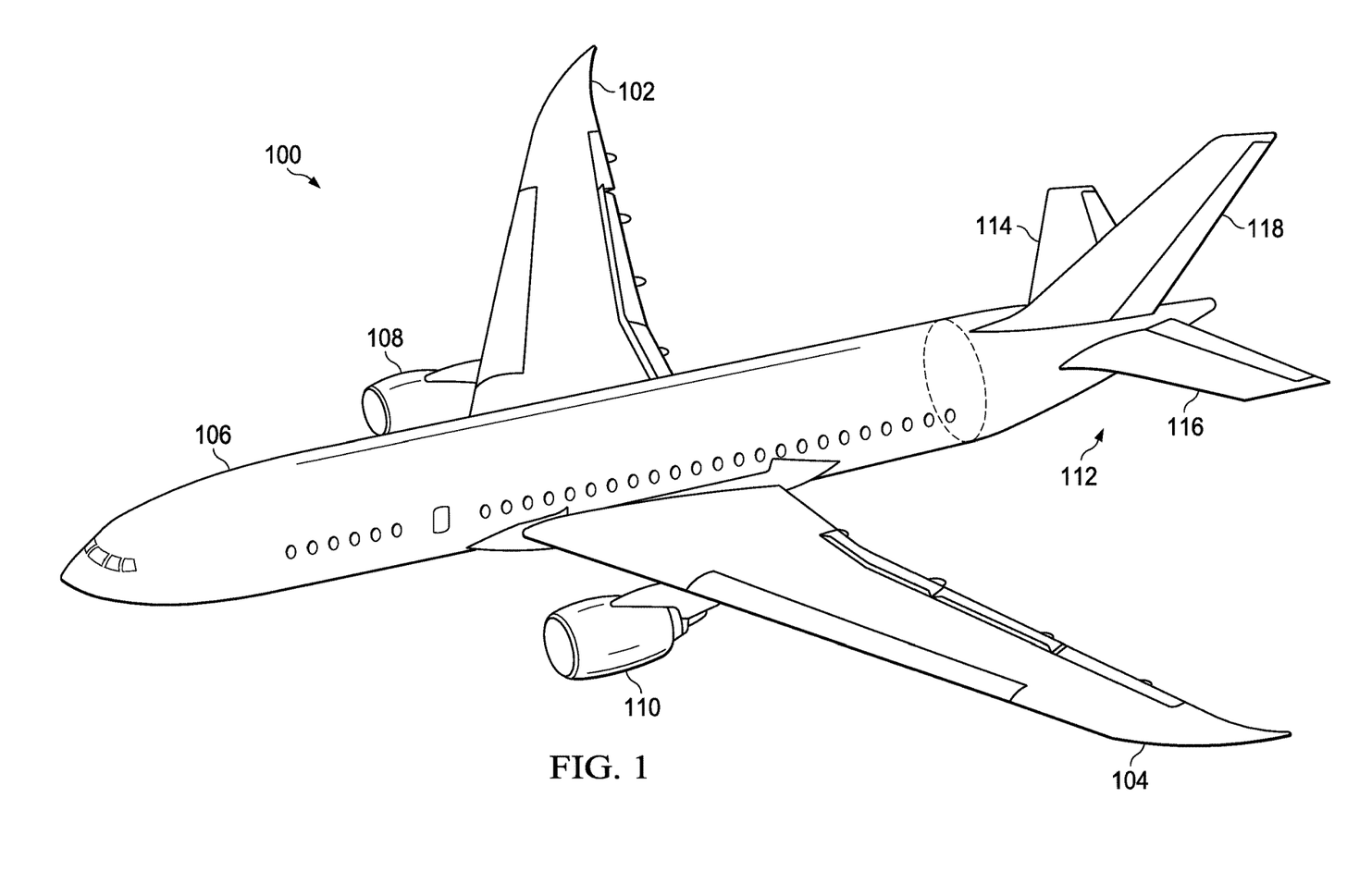
FIG. 1 is an illustration of an aircraft in accordance with an illustrative example.

With reference now to the figures, and in particular, with reference to FIG. 1, an illustration of an aircraft is depicted in accordance with an illustrative example. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which a hanging scaffold system may be implemented in accordance with an illustrative example. For example, the pressure bulkhead area of an aircraft located in the tail section 112 may be assembled or have maintenance performed thereon with the aid of a hanging scaffold system.

The illustration of aircraft 100 in FIG. 1 is not meant to imply physical or architectural limitations to the manner in which an illustrative example may be implemented. For example, although aircraft 100 is a commercial aircraft, aircraft 100 may be a military aircraft, a rotorcraft, a helicopter, an unmanned aerial vehicle, or any other suitable aircraft.

Although the illustrative examples for an illustrative example are described with respect to an aircraft, the illustrative example may be applied to other types of platforms. The platform may be, for example, a mobile platform, a stationary platform, a land-based structure, an aquatic-based structure, and a space-based structure.

Figure 2:
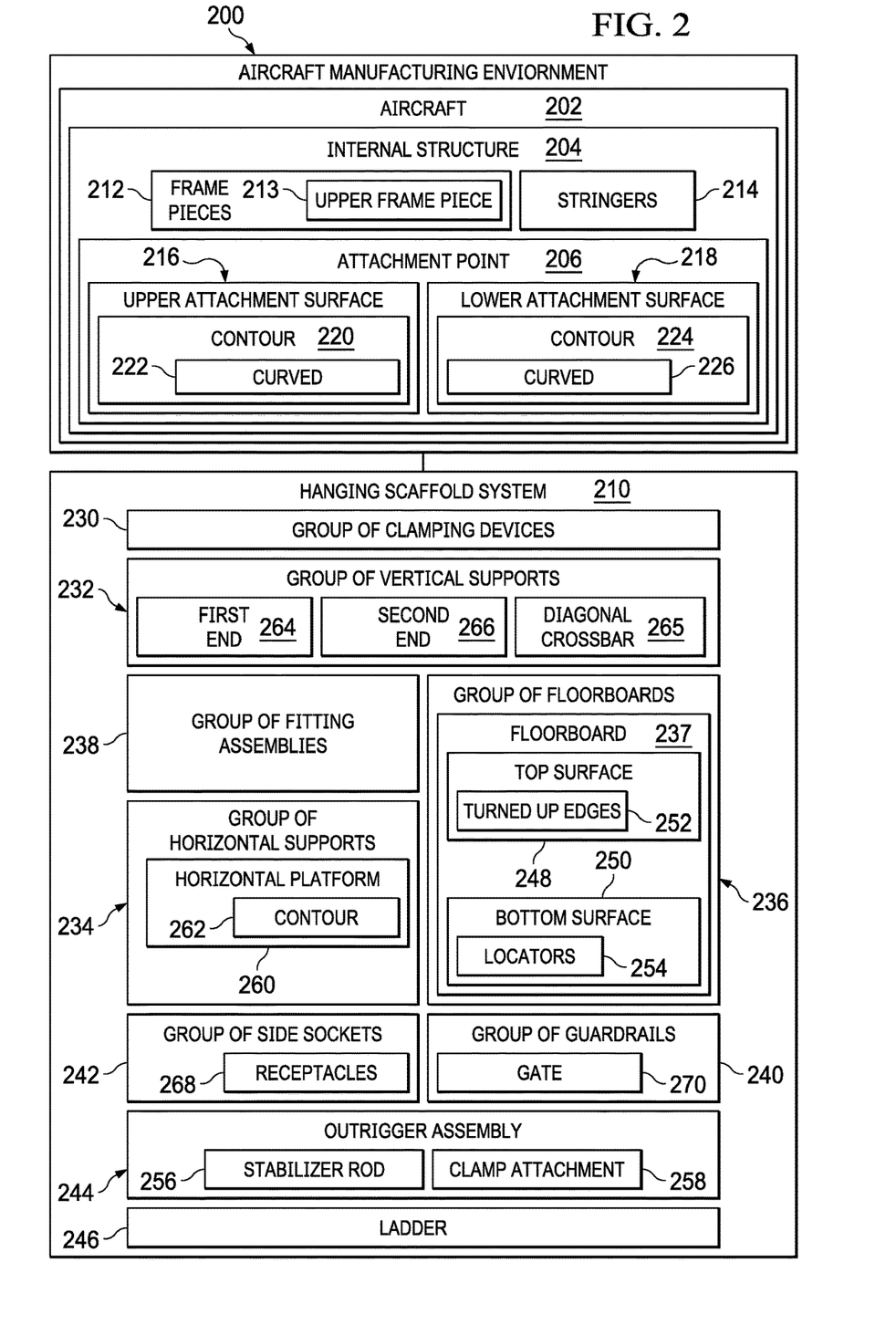
FIG. 2 is an illustration of a manufacturing environment in the form of a block diagram in accordance with an illustrative example.

Turning now to FIG. 2, an illustration of a block diagram of an aircraft manufacturing environment is depicted in accordance with an illustrative example. In aircraft manufacturing environment 200, aircraft 202 includes internal structure 204.

As depicted, aircraft 202 has internal structure 204 that provides attachment points for hanging scaffold system 210 to be suspended from.

Internal structure 204 may be comprised of frame pieces 212, including upper frame piece 213, forming the cylindrical shape of the fuselage and stringers 214 connecting frame pieces 212 longitudinally to which the skin of the fuselage is attached. Frame pieces 212, including upper frame piece 213, have I-beam shaped edges. The I-beam shaped edges of upper frame piece 213 provide upper attachment surface 216 and lower attachment surface 218. Each attachment point, for example attachment point 206, along upper frame piece 213 includes upper attachment surface 216 and lower attachment surface 218. Since frame pieces 212, including upper frame piece 213, form the cylindrical shape of the fuselage of aircraft 202, upper attachment surface 216 has contour 220. Contour 220 may be curved 222. Similarly, lower attachment surface 218 has contour 224. Contour 224 may be curved 226. Attachment point 206 is an example of the attachment points from which hanging scaffold system 210 is suspended along upper frame piece 213.

As depicted, hanging scaffold system 210 provides a stable walking platform suspended from upper frame piece 213 of internal structure 204 of aircraft 202. Each vertical support of group of vertical supports 232 of hanging scaffold system 210 is associated with a clamping device of group of clamping devices 230. Each clamping device of group of clamping devices 230 is associated with an attachment point, for example attachment point 206. Hanging scaffold system 210 is suspended from each attachment point such that hanging scaffold system 210 is suspended off the floor of aircraft 202 and is capable of supporting up to 600 lbs. Hanging scaffold system 210 is suspended from internal structure 204 such that hanging scaffold system does not contact the pressure dome of the pressure bulkhead area. Attachment point 206 is an example of the attachment points from which hanging scaffold system 210 is suspended.

When one component is "associated" with another component, the association is a physical association. For example, a first component, such as group of vertical supports 232, may be considered to be physically associated with a second component, such as group of clamping devices 230, by at least one of being secured to the second component, bonded to the second component, mounted to the second component, welded to the second component, fastened to the second component, or connected to the second component in some other suitable manner. The first component also may be connected to the second component using a third component. The first component may also be considered to be physically associated with the second component by being formed as part of the second component, an extension of the second component, or both.

Hanging scaffold system 210 comprises group of clamping devices 230, group of vertical supports 232, group of horizontal supports 234, and group of floorboards 236. Group of horizontal supports 234 are connected together using group of fitting assemblies 238 to form horizontal platform 260. Horizontal platform 260 includes an edge having contour 262. Contour 262 is concave and shaped to complement and trace the convex shape of the pressure dome.

Each vertical support of group of vertical supports 232 have first end 264 and second end 266 longitudinally opposite first end 264. Each first end 264 is associated with group of clamping devices 230 while each second end 266 is associated with group of horizontal supports 234. A vertical support of group of vertical supports 232 is connected to another vertical support of group of vertical supports 232 with diagonal crossbar 265. Group of vertical supports 232 is connected to group of horizontal supports 234 via group of fitting assemblies 238.

Group of floorboards 236 may be at least one floorboard 237 or may comprise more than one floorboard shaped to cover horizontal platform 260. Each floorboard of group of floorboards 236 includes top surface 248 and bottom surface 250 opposite top surface 248. Top surface 248 includes turned up edges 252. Turned up edges 252 are a safety feature that provides a point of reference of the edges of group of floorboards 236 for the feet of a user working from hanging scaffold system 210 in order to prevent users from inadvertently stepping off group of floorboards 236 of hanging scaffold system 210. Turned up edges 252 also help prevent tools from falling off group of floorboards 236 of hanging scaffold system 210. Group of floorboards 236 are self-locating with respect to group of horizontal supports 234. Bottom surface 250 includes locators 254. Locators 254 are affixed to bottom surface 250 and are wedged against the sides of group of horizontal supports 234 to fix the position of group of floorboards 236 with respect to group of horizontal supports 234. Group of floorboards 236 includes an edge shaped to match contour 262.

Group of side sockets 242 is associated with the periphery of horizontal platform 260. Group of side sockets 242 includes receptacles 268 sized to receive group of guardrails 240. Group of guardrails 240 may include gate 270. Ladder 246 is associated with horizontal platform 260.

Hanging scaffold system 210 may include outrigger assembly 244. Outrigger assembly 244 includes stabilizer rod 256 and clamp attachment 258. Stabilizer rod 256 is length adjustable and pinned at one end to horizontal platform 260. The opposite end of stabilizer rod 256 is attached to clamp attachment 258. Clamp attachment 258 is configured to securely attach outrigger assembly 244 to frame pieces 212 of internal structure 204 between a pair of stringers 214. Outrigger assembly 244 is oriented generally horizontal and provides extra stability to hanging scaffold system 210 in the event of seismic activity during manufacture or maintenance of aircraft 202 while aircraft 202 is on the ground.

Figure 3:
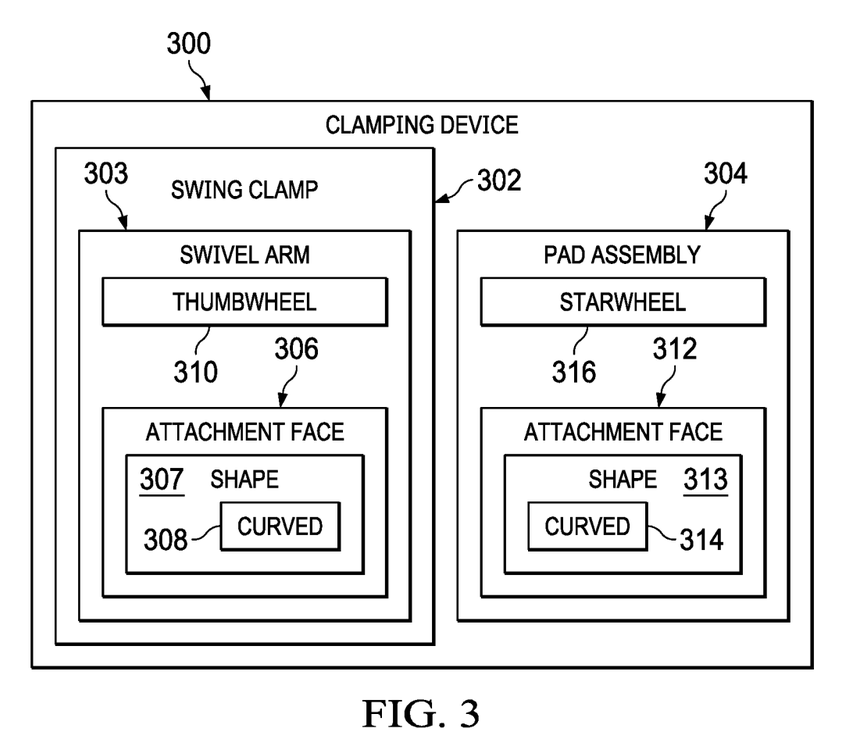
FIG. 3 is an illustration of a clamping device in the form of a block diagram in accordance with an illustrative example.

With reference next to FIG. 3, an illustration of a block diagram of clamping device 300 is depicted in accordance with an illustrative example. In aircraft manufacturing environment 200, clamping device 300 may be an example of a clamping device of group of clamping devices 230. In the illustrative examples, the same reference numeral may be used in more than one figure. This reuse of a reference numeral in different figures represents the same element in the different figures. As depicted, clamping device 300 is located in group of clamping devices 230 in FIG. 2.

In this illustrative example, clamping device 300 comprises at least one swing clamp 302 and pad assembly 304.

As used herein, the phrase "at least one of", when used with a list of items, means different combinations of one or more of the listed items may be used, and only one of each item in the list may be needed. In other words, "at least one of" means any combination of items or number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Swing clamp 302 comprises at least one swivel arm 303. Each swivel arm 303 is pivotally connected to pad assembly 304. Each swivel arm 303 includes at least one attachment face 306. Attachment face 306 is curved 308. Attachment face 306 has shape 307 shaped to mimic contour 220 of upper attachment surface 216 of attachment point 206. Depending upon direction of rotation of thumbwheel 310, attachment face 306 is either tightened securely to upper attachment surface 216 or loosened therefrom. Pad assembly 304 comprises attachment face 312. Attachment face 312 is curved 314. Attachment face 312 has shape 313 shaped to mimic contour 224 of lower attachment surface 218 of attachment point 206. Pad assembly 304 includes at least one starwheel 316. Depending upon direction of rotation of starwheel 316, attachment face 312 is either tightened securely to lower attachment surface 218 or loosened therefrom.

In this illustrative example, all the components of hanging scaffold system 210, when disassembled, fit through the hatch of the aircraft that leads to the pressure bulkhead area. Still further, the dissembled pieces of the hanging scaffold system can be moved into and assembled and disassembled in the pressure bulkhead area by a single user.

The illustration of an aircraft manufacturing environment 200 and the different components in this environment in FIGS. 1-3 are not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

Figure 4:
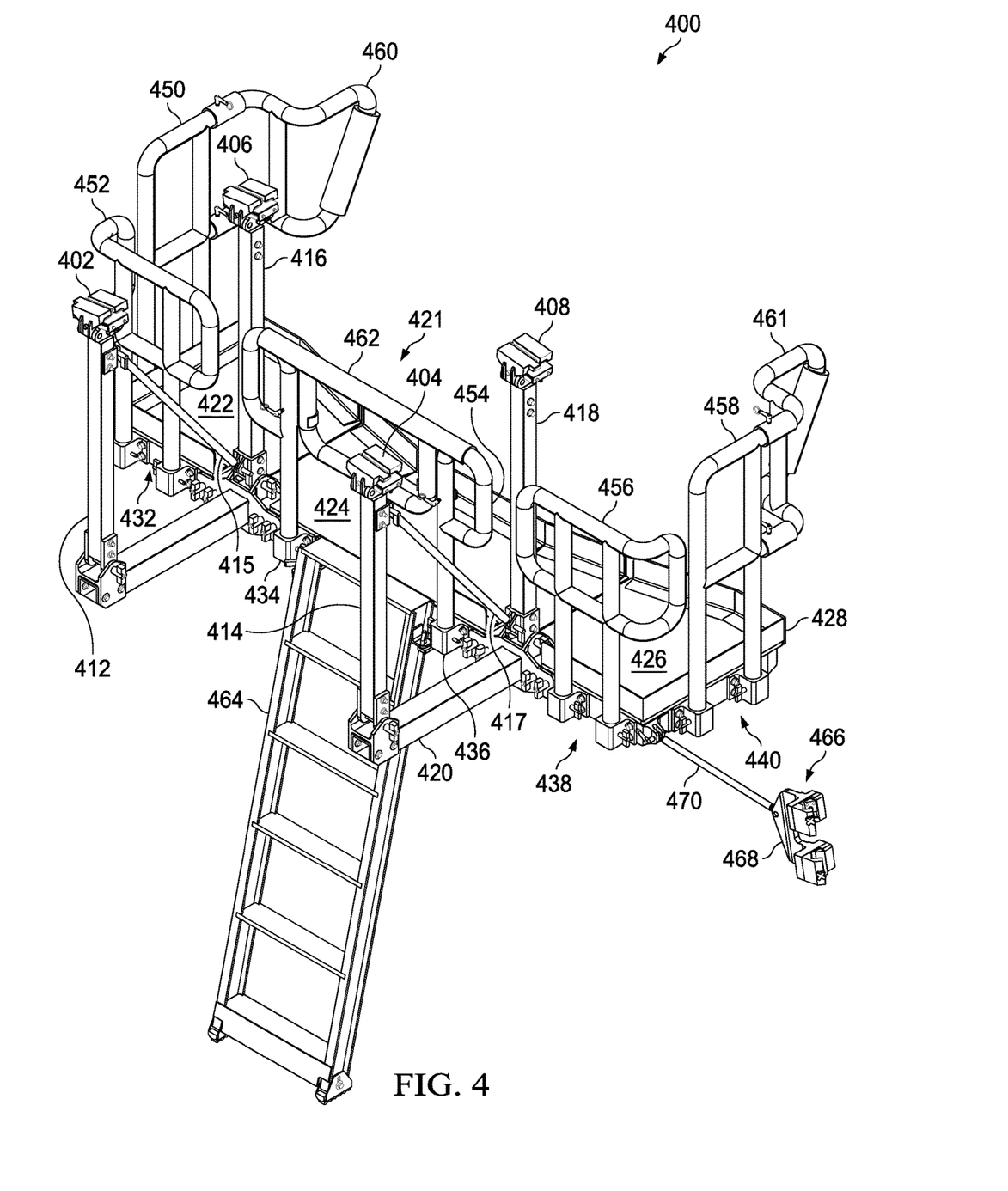
FIG. 4 is an illustration of a hanging scaffold system in accordance with an illustrative example.
Figure 5:
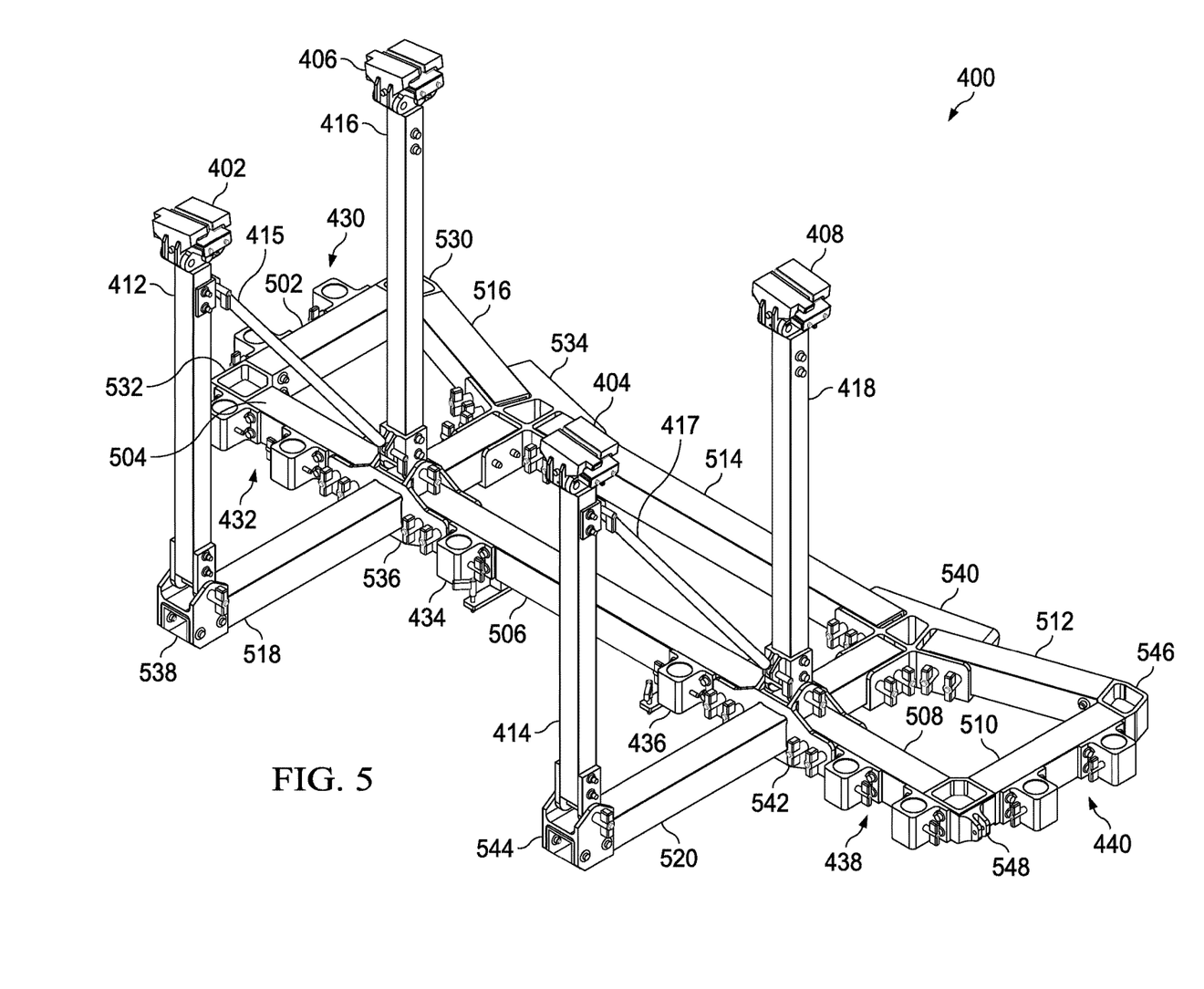
FIG. 5 is an illustration of a hanging scaffold system in accordance with an illustrative example.

With reference now to FIGS. 4-5, illustration of hanging scaffold system 400 is depicted in accordance with an illustrative example. As depicted, hanging scaffold system 400 is an example of one implementation for hanging scaffold system 210 in FIG. 2.

As depicted, hanging scaffold system 400 includes a group of clamping devices including clamping device 402, clamping device 404, clamping device 406, and clamping device 408. The group of clamping devices securely attach hanging scaffold system 400 to the internal structure of an aircraft such that hanging scaffold system 400 is suspended off the floor of the aircraft. Each clamping device is connected to the internal structure of the aircraft at a separate attachment point. Attachment point 206 is an example of the attachment points from which hanging scaffold system 400 is suspended.

The clamping devices are connected to a group of vertical supports including vertical support 412, vertical support 414, vertical support 416, and vertical support 418, respectively. The group of vertical supports is connected to horizontal platform 420. Diagonal crossbar 415 is connected to a first end of vertical support 412 and to an opposite end of vertical support 416. Diagonal crossbar 417 is connected to a first end of vertical support 414 and to an opposite end of vertical support 418. A group of floorboards including floorboard 422, floorboard 424, and floorboard 426 are associated with horizontal platform 420. Floorboards 422, 424, and 426 each include turned up edges 428. The edge of horizontal platform 420 facing the pressure dome includes contour 421. Floorboards 422, 424, and 426 follow contour 421 also. Contour 421 traces the conical shape of the pressure dome. Contour 421 allows hanging scaffold system 400 to provide improved access to the pressure dome without contacting the pressure dome.

A group of side sockets including side socket 430, side socket 432, side socket 434, side socket 436, side socket 438, and side socket 440 are associated with horizontal platform 420. Side sockets 430, 432 are associated with horizontal platform 420 adjacent floorboard 422. Side sockets 434, 436 are associated with horizontal platform 420 adjacent floorboard 424. Side sockets 438, 440 are associated with horizontal platform 420 adjacent floorboard 426.

A group of guardrails including guardrail 450, guardrail 452, guardrail 454, guardrail 456, and guardrail 458 are received and securely held in place by the group of side sockets. Guardrail 450 includes padded extension 460. Guardrail 458 includes padded extension 461. Padded extensions 460, 461 provide protection for the sensitive pressure dome should hanging scaffold system 400 inadvertently contact the pressure dome. Guardrail 454 includes gate 462. Gate 462 is pivotally attached to guardrail 454 and swings open to allow a user access to horizontal platform 420. Gate 462 can be secured in an open or closed position. Ladder 464 is attached to horizontal platform 420 at a base of guardrail 454 and provides access to gate 462.

Outrigger assembly 466 comprises clamp attachment 468 connected to one end stabilizer rod 470. An opposite end of stabilizer rod 470 is attached to horizontal platform 420. Stabilizer rod 470 is adjustable lengthwise. Clamp attachment 468 is securely attached to the internal structure of the aircraft. Outrigger assembly 466 provides extra stability and is especially effective at reducing movement of hanging scaffold system during seismic activity should it occur.

As shown in FIG. 5, hanging scaffold system 400 with the group of floorboards, the group of guardrails, and ladder 464 removed is depicted in accordance with an illustrative example.

A group of horizontal supports includes horizontal support 502, horizontal support 504, horizontal support 506, horizontal support 508, horizontal support 510, horizontal support 512, horizontal support 514, horizontal support 516, horizontal support 518, and horizontal support 520.

A group of fitting assemblies includes fitting assembly 530, fitting assembly 532, fitting assembly 534, fitting assembly 536, fitting assembly 538, fitting assembly 540, fitting assembly 542, fitting assembly 544, fitting assembly 546, and fitting assembly 548. The group of fitting assemblies connect the group of horizontal supports together to form horizontal platform 420 minus the group of floorboards. Fitting assemblies 534, 540 attach horizontal supports 512, 514, and 516 at an angle that maintains contour 421.

Vertical support 412 is pivotally connected to horizontal support 518 with fitting assembly 538. Vertical support 414 is pivotally connected to horizontal support 520 with fitting assembly 544. Vertical support 416 is pivotally connected to the junction of horizontal supports 504, 506, and 518 with fitting assembly 536. Vertical support 418 is pivotally connected to the junction of horizontal supports 506, 508, and 520 with fitting assembly 542. Spring pins secure the pivotal connections and prevent further pivoting once hanging scaffold system 400 is desirably positioned.

Figure 6:
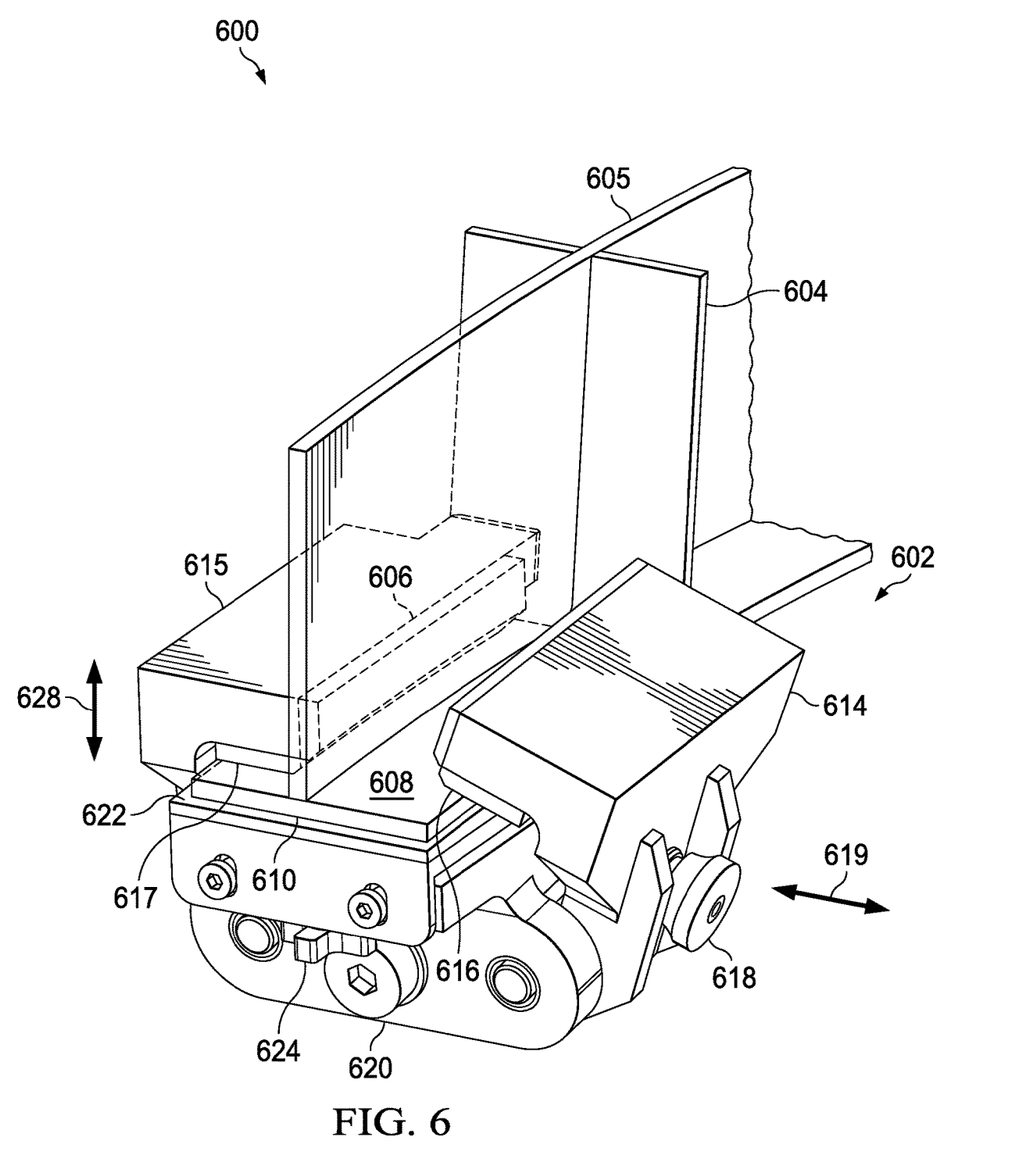
FIG. 6 is an illustration of a clamping device in relation to an internal structure of an aircraft in accordance with an illustrative example.
Figure 7:
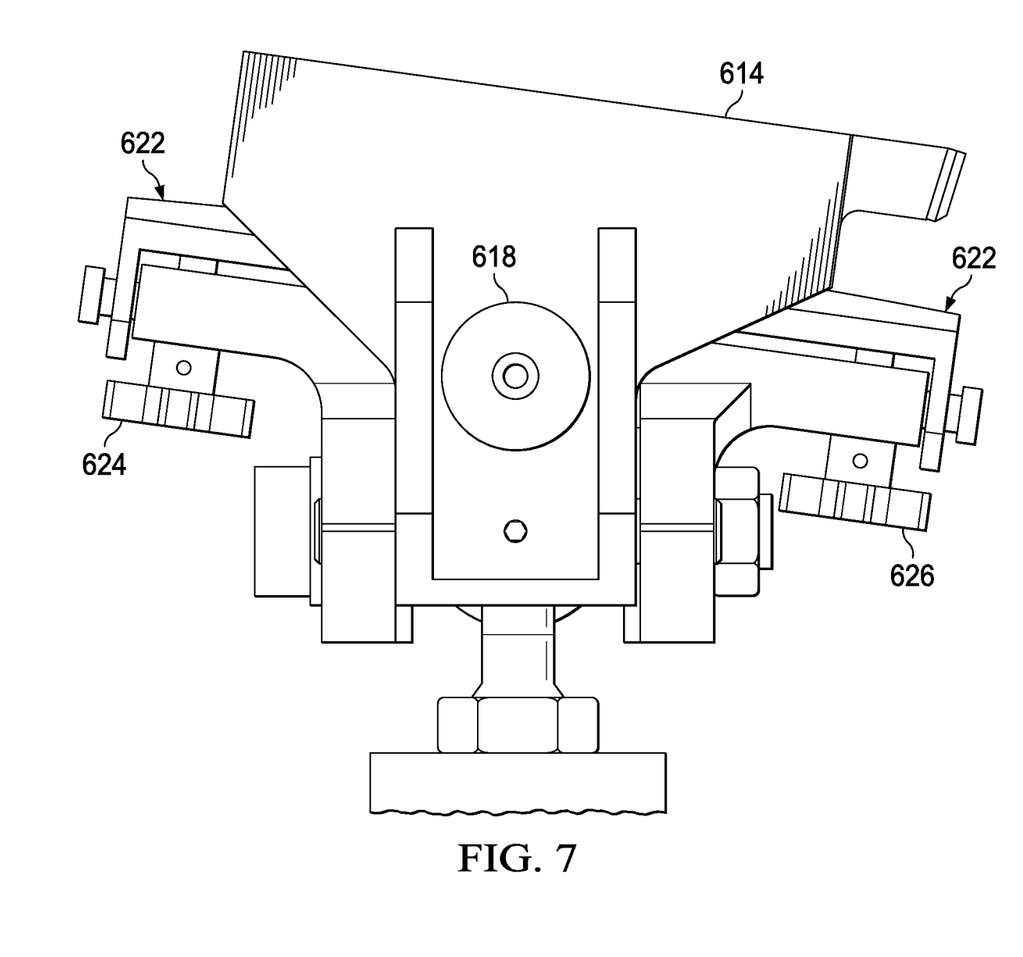
FIG. 7 is an illustration of a clamping device in accordance with an illustrative example.

With reference now to FIGS. 6-7, illustration of a clamping device in relation to an internal structure of an aircraft is depicted in accordance with an illustrative example. As depicted, clamping device 600 is an example of one implementation of clamping device 300 in FIG. 3 and one clamping device of group of clamping devices 230 in FIG. 2.

As illustrated, clamping device 600 includes swing clamp 602 in the process of being secured to internal structure 604 at attachment point 606. Internal structure 604 is an example of internal structure 204 in FIG. 2. As depicted, internal structure 604 has an I-beam shaped edge. Attachment point 606 is an example of attachment point 206 in FIG. 2. Attachment point 606 includes upper attachment surface 608 and lower attachment surface 610. Internal structure 604 includes rib 605 which bifurcates upper attachment surface 608. Internal structure 604 forms the cylindrical shape of the fuselage an aircraft, thus upper attachment surface 608 and lower attachment surface 610 are curved.

Swing clamp 602 includes swivel arms 614 and 615. Swivel arm 614 includes attachment face 616 and swivel arm 615 includes attachment face 617. Attachment faces 616, 617 are curved to match the curve of upper attachment surface 608. Both swivel arms 614, 615 include a thumbwheel to secure each swivel arm to the attachment point or loosen therefrom. For example, swivel arm 614 includes thumbwheel 618. Rotation of thumbwheel 618 moves swivel arm 614 in direction 619 with respect to internal structure 604 in order to secure swivel arm 614 tightly against rib 605 or loosen therefrom.

Swing clamp 602 includes pad assembly 620. Swivel arms 614, 615 are pivotally attached to pad assembly 620. Pad assembly includes attachment face 622. Attachment face 622 is curved to match the curve of lower attachment surface 610. Pad assembly 620 includes at least a pair of starwheels 624, 626 flanking swivel arms 614, 615. Rotation of starwheels 624, 626 moves attachment face 622 in direction 628 with respect to internal structure 604 and swivel arms 614, 615 in order to stabilize pad assembly tightly against lower attachment surface 610 or loosen therefrom.

Figure 8:
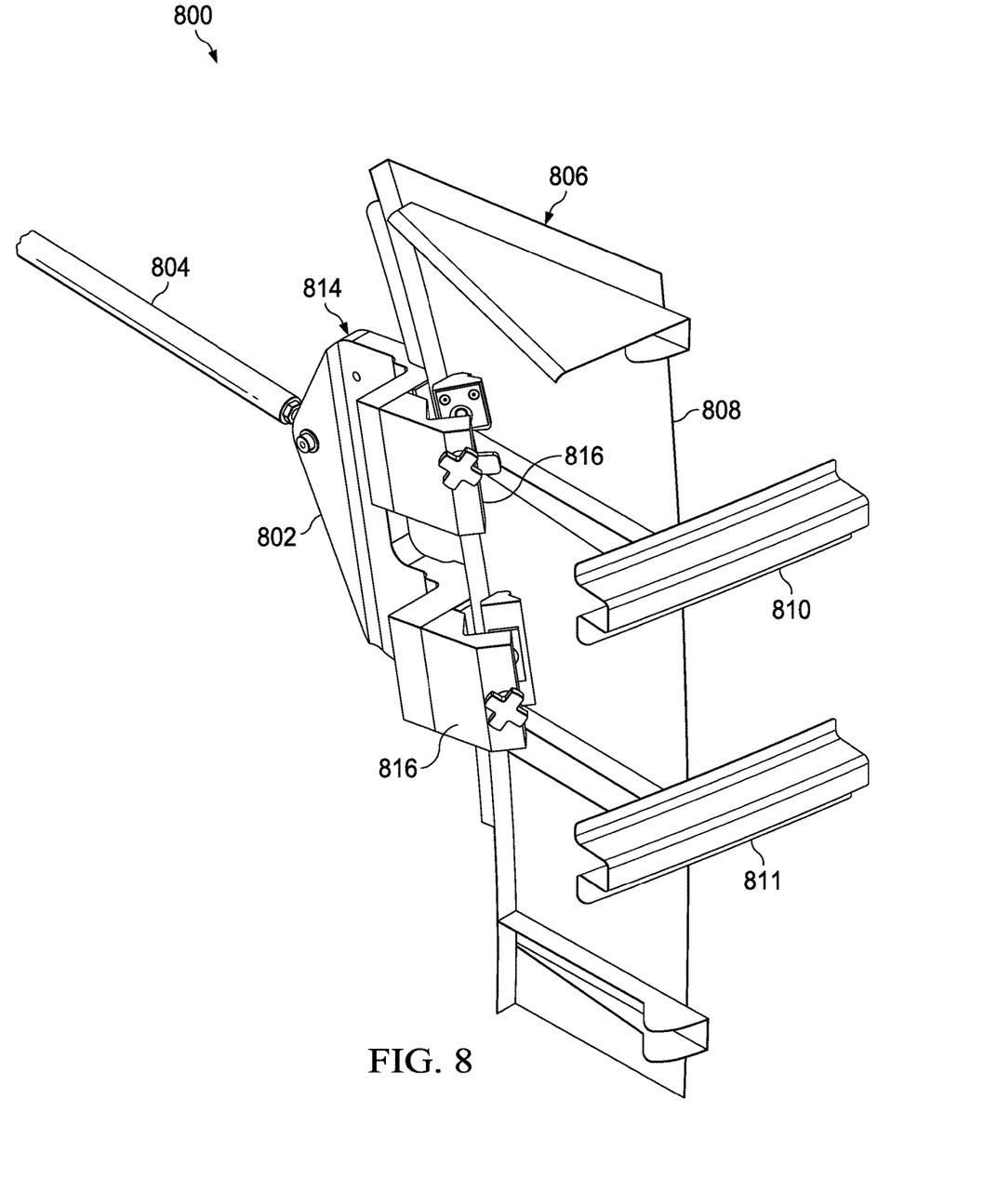
FIG. 8 is an illustration of an outrigger assembly in relation to an internal structure of an aircraft in accordance with an illustrative example.
Figure 9:
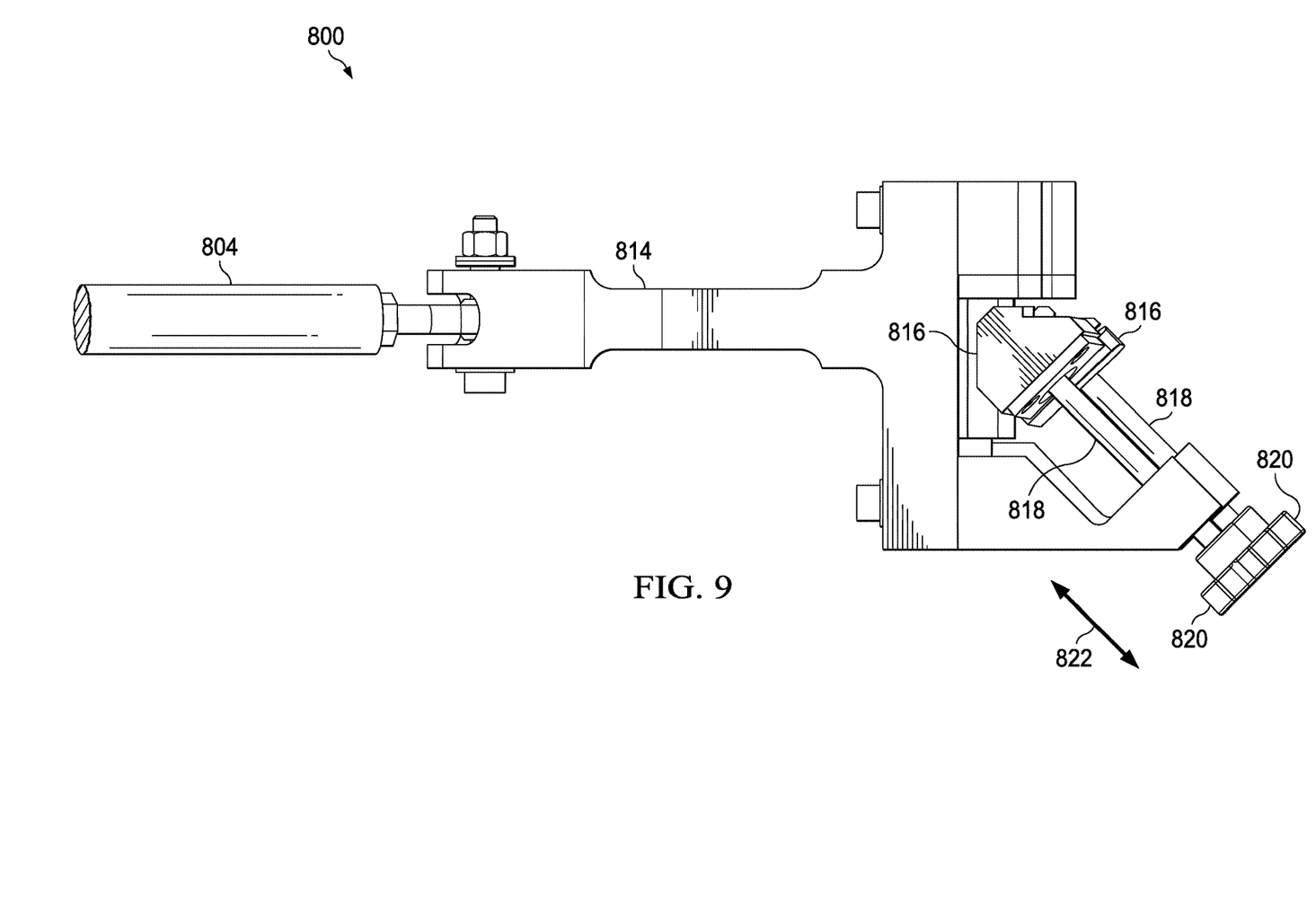
FIG. 9 is an illustration of an outrigger assembly in accordance with an illustrative example.

With reference now to FIGS. 8-9, illustration of an outrigger assembly in relation to an internal structure of an aircraft is depicted in accordance with an illustrative example. As depicted, outrigger assembly 800 is an example of one implementation of outrigger assembly 244 in FIG. 2 and outrigger assembly 466 in FIG. 4.

As illustrated in FIGS. 8-9, outrigger assembly 800 includes clamp attachment 802 and stabilizer rod 804. Outrigger assembly is attached to internal structure 806 along an I-beam shaped edge of frame piece 808 between stringers 810, 811 such that stabilizer rod is generally horizontal. Internal structure 806 is an example of internal structure 204 in FIG. 2 and internal structure 604 in FIG. 6. Outrigger assembly 800 provides extra stability and is effective at reducing movement of the hanging scaffold system during seismic activity.

Clamp attachment 802 comprises housing 814 and at least one clamp 816. Clamp 816 is mounted on one end of threaded rod 818 while thumbwheel 820 is mounted to an opposite end of threaded rod 818. Rotation of thumbwheel 820 moves threaded rod 818 and thus clamp 816 in direction 822 to secure clamp 816 and clamp attachment 802 to internal structure 806 or loosen therefrom. Stabilizer rod 804 is connected to clamp attachment 802 on one end and connected to horizontal platform 420 (As shown in FIG. 4) on an opposite end. The length of stabilizer rod 804 is capable of adjustment to fine tune connection of outrigger assembly 800 to internal structure 806.

The illustrations of the components of hanging scaffold system 400 in FIGS. 4-9 are provided for the purpose of showing different physical implementations for hanging scaffold system 210 shown in block form in FIG. 2. These illustrations are not meant to limit the manner in which other illustrative examples may be implemented.

Figure 10:
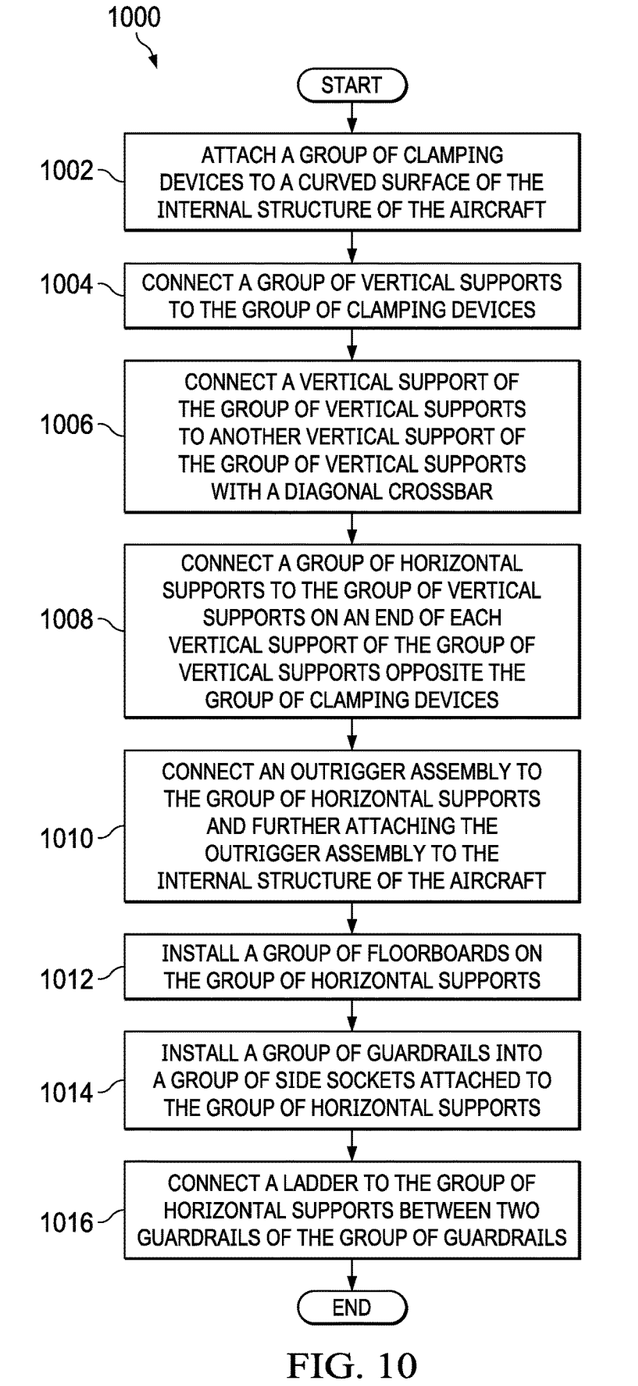
FIG. 10 is an illustration of a flowchart of a process for assembling and attaching a hanging scaffold system to an internal structure of an aircraft in accordance with an illustrative example.

Turning next to FIG. 10, an illustration of a flowchart of a process 1000 for assembling and attaching a hanging scaffold system to an internal structure of an aircraft is depicted in accordance with an illustrative example. The process illustrated in FIG. 10 may be implemented using hanging scaffold system 210 within aircraft 202 in FIG. 2.

Process 1000 begins by attaching a group of clamping devices to a curved surface of the internal structure of the aircraft (operation 1002). Attaching a group of clamping devices includes positioning a plurality of curved attachment faces of each clamping device adjacent to the curved surface of the internal structure of the aircraft where a shape of the plurality of curved attachment faces matches a contour of the curved surface of the internal structure of the aircraft. Attaching a group of clamping devices further includes stabilizing the plurality of curved attachment faces to the internal structure of the aircraft by rotating a tightening device for each attachment face. The clamping device comprises a swing clamp pivotally attached to a pad assembly, wherein attaching the group of clamping devices further comprises closing the swing clamp over an upper surface of an attachment point of the internal structure of the aircraft and positioning the pad assembly adjacent to a lower surface of the attachment point of the internal structure of the aircraft. After closing the swing clamp, rotating a tightening device for each attachment face includes turning a thumbwheel of the swing clamp to secure the swing clamp to the internal structure of the aircraft. After positioning the pad assembly, rotating a tightening device for each attachment face includes simultaneously turning a first star wheel and a second star wheel to stabilize the pad assembly to the internal structure of the aircraft.

At operation 1004, the process continues with connecting a group of vertical supports to the group of clamping devices. At operation 1006, connecting a vertical support of the group of vertical supports to another vertical support of the group of vertical supports with a diagonal crossbar. The process continues with connecting a group of horizontal supports to the group of vertical supports on an end of each vertical support of the group of vertical supports opposite the group of clamping devices at operation 1008.

At operation 1010, the process continues with connecting an outrigger assembly to the group of horizontal supports and further attaching the outrigger assembly to the internal structure of the aircraft. At operation 1012, installing a group of floorboards on the group of horizontal supports. Next, at operation 1014, the process includes installing a group of guardrails into a group of side sockets attached to the group of horizontal supports. At operation 1016 the process ends with connecting a ladder to the group of horizontal supports between two guardrails of the group of guardrails.

The operations described above are not relegated to the order the operations were presented. Some operations can be performed prior to previously described operations and some can be performed simultaneously. The order the operations were presented does not imply an order for the operations to be performed in.

Figure 11:
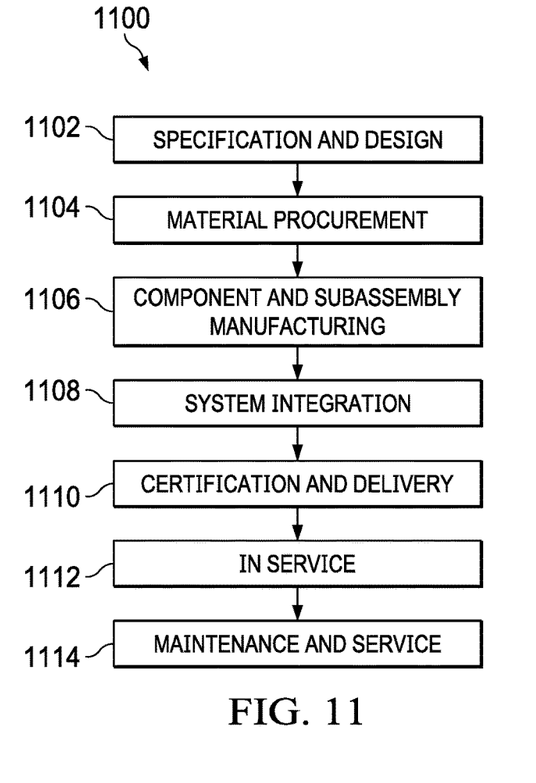
FIG. 11 is an illustration of an aircraft manufacturing and service method in accordance with an illustrative example.
Figure 12:
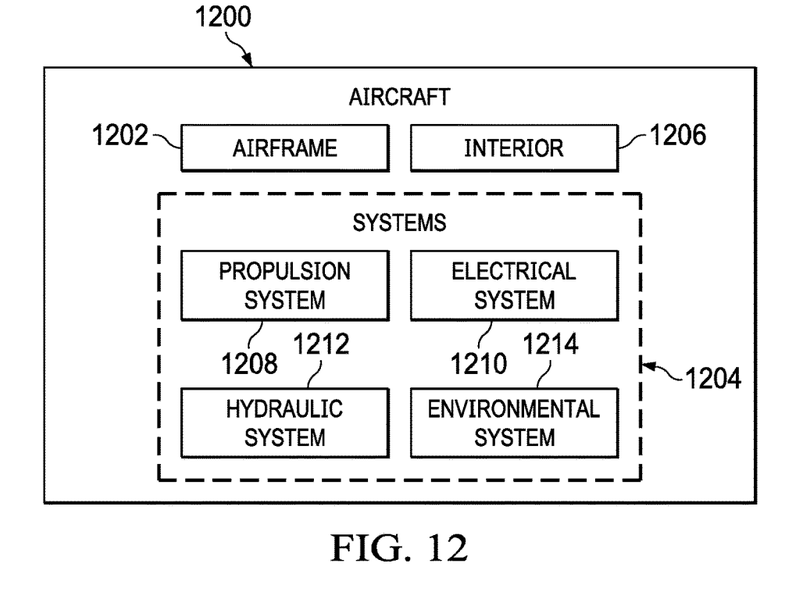
FIG. 12 is an illustration of an aircraft in which an illustrative example may be implemented.

The illustrative examples of the present disclosure may be described in the context of aircraft manufacturing and service method 1100 as shown in FIG. 11 and aircraft 1200 as shown in FIG. 12. Turning first to FIG. 11, an illustration of an aircraft manufacturing and service method is depicted in accordance with an illustrative example. During pre-production, aircraft manufacturing and service method 1100 may include specification and design 1102 of aircraft 1200 in FIG. 12 and material procurement 1104.

During production, component and subassembly manufacturing 1106 and system integration 1108 of aircraft 1200 in FIG. 12 take place. Thereafter, aircraft 1200 may go through certification and delivery 1110 in order to be placed in service 1112. While in service 1112 by a customer, aircraft 1200 is scheduled for routine maintenance and service 1114, which may include modification, reconfiguration, refurbishment, and other maintenance or service.

Each of the processes of aircraft manufacturing and service method 1100 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of an aircraft is depicted in which an illustrative example may be implemented. In this example, aircraft 1200 is produced by aircraft manufacturing and service method 1100 in FIG. 11 and may include airframe 1202 with a plurality of systems 1204 and interior 1206. Examples of systems 1204 include one or more of propulsion system 1208, electrical system 1210, hydraulic system 1212, and environmental system 1214. Any number of other systems may be included. Although an aerospace example is shown, different illustrative examples may be applied to other industries, such as the automotive industry. The apparatuses and methods embodied herein may be employed during at least one of the stages of aircraft manufacturing and service method 1100 in FIG. 11.

In one illustrative example, components or subassemblies produced in component and subassembly manufacturing 1106 in FIG. 11 may be fabricated or manufactured in a manner similar to components or subassemblies produced while aircraft 1200 is in service 1112 in FIG. 11. As yet another example, one or more apparatus examples, method examples, or a combination thereof may be utilized during production stages, such as component and subassembly manufacturing 1106 and system integration 1108 in FIG. 11. One or more apparatus examples, method examples, or a combination thereof may be utilized while aircraft 1200 is in service 1112, during maintenance and service 1114 in FIG. 11, or both. For example, the hanging scaffold system may be used during in maintenance and service 1114 to provide stable and safe access to the pressure bulkhead area of aircraft 1200.

Thus, the illustrative examples provide a method and apparatus for providing stable and safe access to the aft pressure bulkhead area of an aircraft. Thus, a hanging scaffold system may provide a method and apparatus that overcome a technical problem with a stable assembly and maintenance environment for accessing the aft pressure bulkhead area of an aircraft without jeopardizing the integrity of the pressure dome. For example, the hanging scaffold system can be moved into and assembled within the aft pressure bulkhead area of an aircraft by a single technician. Further, the hanging scaffold system is suspended from the internal structure of the aircraft off the floor of the aircraft and secured in position by clamping devices. Currently available systems do not provide these types of functions.

The description of the different illustrative examples has been presented for purposes of illustration and description and is not intended to be exhaustive or limited to the examples in the form disclosed. The different illustrative examples describe components that perform actions or operations. In an illustrative example, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative examples may provide different features as compared to other desirable examples. The example or examples selected are chosen and described in order to best explain the principles of the examples, the practical application, and to enable others of ordinary skill in the art to understand the disclosure for various examples with various modifications as are suited to the particular use contemplated.

Clause 1: An apparatus comprises a group of horizontal supports to support at least one floorboard, a group of vertical supports connected to and extending perpendicularly from the group of horizontal supports, and a clamping device attached to each vertical support of the group of vertical supports, wherein the clamping device is configured to engage an attachment point on an internal structure of an aircraft.

Clause 2: The apparatus of Clause 1, wherein the clamping device has an attachment face that has a shape configured to match a contour of the attachment point on the internal structure of the aircraft.

Clause 3: The apparatus of Clause 2, wherein the shape is curved and configured to match a curved attachment point on the internal structure of the aircraft.

Clause 4: The apparatus of any of Clauses 1-4, wherein the clamping device comprises a swing clamp pivotally attached to a pad assembly, wherein both the swing clamp and the pad assembly are configured to adjustably attach to a curved attachment point on the internal structure of the aircraft.

Clause 5: The apparatus of Clause 4, wherein the attachment point on the internal structure of the aircraft has an upper attachment surface and a lower attachment surface and the swing clamp has a first curved attachment face configured to match the upper attachment surface and the pad assembly has a second curved attachment face configured to match the lower attachment surface.

Clause 6: The apparatus of any of Clauses 1-5, further comprising a group of guardrails connected to the group of horizontal supports.

Clause 7: The apparatus of Clause 6, further comprising a group of side sockets attached to the group of horizontal supports, wherein the group of side sockets supports the group of guardrails.

Clause 8: The apparatus of any of Clauses 1-7, wherein a group of fitting assemblies connects a horizontal support of the group of horizontal supports to another horizontal support of the group of horizontal supports.

Clause 9: The apparatus of Clause 8, wherein the group of fitting assemblies connects the group of vertical supports to the group of horizontal supports.

Clause 10: The apparatus of any of Clauses 1-9, wherein a vertical support of the group of vertical supports is pivotally connected to a horizontal support of the group of horizontal supports via a group of fitting assemblies.

Clause 11: The apparatus of any of Clauses 1-10, further comprising an outrigger assembly connected to the group of horizontal supports, wherein the outrigger assembly comprises an adjustable stabilizer rod and a clamp attachment.

Clause 12: The apparatus of any of Clauses 1-11, wherein the at least one floorboard comprises turned up edges opposite a bottom surface and a plurality of locators connected to the bottom surface, wherein the plurality of locators is wedged against side surfaces of the group of horizontal supports.

Clause 13: The apparatus of any of Clauses 1-12, wherein the internal structure of the aircraft is selected from at least one of a frame, an airframe, a rib, a truss, or a stringer.

Clause 14: A hanging scaffold system for attachment to an internal structure of an aircraft comprising a group of clamping devices configured to be attachable to the internal structure of the aircraft, a group of vertical supports connected to the group of clamping devices, a group of horizontal supports connected to the group of vertical supports, and a group of floorboards supported by the group of horizontal supports.

Clause 15: The hanging scaffold system of Clause 14, wherein a clamping device of the group of clamping devices comprises an attachment face having a curved shape configured to match a contour of the internal structure of the aircraft.

Clause 16: The hanging scaffold system of Clause 14 or 15, wherein a clamping device of the group of clamping devices comprises a swing clamp pivotally attached to a pad assembly, wherein both the swing clamp and the pad assembly include curved attachment faces and are configured to adjustably attach to a curved attachment point on the internal structure of the aircraft, wherein the curved attachment faces match a contour of the curved attachment point on the internal structure of the aircraft.

Clause 17: The hanging scaffold system of any of Clauses 14-16, wherein a group of fitting assemblies connects a horizontal support of the group of horizontal supports to another horizontal support of the group of horizontal supports and pivotally connects each vertical support of the group of vertical supports to the group of horizontal supports.

Clause 18: The hanging scaffold system of any of Clauses 14-17, further comprising a group of guardrails connected to the group of horizontal supports.

Clause 19: The hanging scaffold system of any of Clauses 14-18, further comprising an outrigger assembly connected to the group of horizontal supports, wherein the outrigger assembly comprises an adjustable stabilizer rod and a clamp attachment.

Clause 20: The hanging scaffold system of any of Clauses 14-19, wherein a floorboard of the group of floorboards comprises a plurality of turned up edges opposite a bottom surface, and a plurality of locators connected to the bottom surface, wherein the plurality of locators is configured to be wedged against side surfaces of the group of horizontal supports.

Clause 21: The hanging scaffold system of any of Clauses 14-20, wherein the internal structure of the aircraft is selected from at least one of a frame, an airframe, a rib, a truss, or a stringer.

Clause 22: A method for attaching a hanging scaffold system to an internal structure of an aircraft, comprising attaching a group of clamping devices to a curved surface of the internal structure of the aircraft, connecting a group of vertical supports to the group of clamping devices, connecting a vertical support of the group of vertical supports to another vertical support of the group of vertical supports with a diagonal crossbar, connecting a group of horizontal supports to the group of vertical supports on an end of each vertical support of the group of vertical supports opposite the group of clamping devices, connecting an outrigger assembly to the group of horizontal supports and further attaching the outrigger assembly to the internal structure of the aircraft, and installing a group of floorboards on the group of horizontal supports.

Clause 23: The method of Clause 22, further comprising installing a group of guardrails into a group of side sockets attached to the group of horizontal supports and connecting a ladder to the group of horizontal supports between two guardrails of the group of guardrails.

Clause 24: The method of Clause 22 or 23, wherein attaching the group of clamping devices comprises positioning a plurality of curved attachment faces of each clamping device adjacent to the curved surface of the internal structure of the aircraft where a shape of the plurality of curved attachment faces matches a contour of the curved surface of the internal structure of the aircraft, and stabilizing the plurality of curved attachment faces to the internal structure of the aircraft by rotating a tightening device for each attachment face.

Clause 25: The method of any of Clauses 22-24, wherein a clamping device of the group of clamping devices comprises a swing clamp pivotally attached to a pad assembly, wherein attaching the group of clamping devices comprises closing the swing clamp over an upper surface of an attachment point of the internal structure of the aircraft and positioning the pad assembly adjacent to a lower surface of the attachment point of the internal structure of the aircraft.

Clause 26: The method of Clause 25, wherein after closing the swing clamp, turning a thumbwheel of the swing clamp to secure the swing clamp to the internal structure of the aircraft.

Clause 27: The method of Clause 25 or 26, wherein after positioning the pad assembly, simultaneously turning a first star wheel and a second star wheel to stabilize the pad assembly to the internal structure of the aircraft.

Clause 28: The method of any of Clauses 25-27, wherein both the swing clamp and the pad assembly include curved attachment faces and are configured to adjustably attach to a curved attachment point on the internal structure of the aircraft, wherein the curved attachment faces match a contour of the curved attachment point on the internal structure of the aircraft.

What is claimed is:

1. An apparatus, comprising:
  a group of horizontal supports to support a group of floorboards;
  a group of vertical supports connected to and extending perpendicularly from the group of horizontal supports; and
  a clamping device attached to each vertical support of the group of vertical supports, wherein each of the clamping devices comprises a swing clamp pivotally attached to a pad assembly;
  wherein each of the clamping devices is configured to engage an attachment point on an internal structure of an aircraft.

2. The apparatus of claim 1, wherein each of the clamping devices has an attachment face that has a shape configured to match a contour of the attachment point on the internal structure of the aircraft.

3. The apparatus of claim 2, wherein the shape is curved and configured to match a curved attachment point of the attachment point on the internal structure of the aircraft.

4. The apparatus of claim 1, wherein both each of the swing clamps and each of the pad assemblies are configured to adjustably attach to a curved attachment point of the attachment point on the internal structure of the aircraft.

5. The apparatus of claim 4, wherein the curved attachment point on the internal structure of the aircraft has an upper attachment surface and a lower attachment surface and each of the swing clamps has a first curved attachment face configured to match the upper attachment surface and each of the pad assemblies has a second curved attachment face configured to match the lower attachment surface.

6. The apparatus of claim 1, further comprising a group of guardrails connected to the group of horizontal supports.

7. The apparatus of claim 6, further comprising a group of side sockets attached to the group of horizontal supports, wherein the group of side sockets supports the group of guardrails.

8. The apparatus of claim 1, wherein a group of fitting assemblies connects a horizontal support of the group of horizontal supports to another horizontal support of the group of horizontal supports.

9. The apparatus of claim 1, further comprising an outrigger assembly connected to the group of horizontal supports, wherein the outrigger assembly comprises an adjustable stabilizer rod and a clamp attachment.

10. The apparatus of claim 1, wherein at least one floorboard of the group of floorboards comprises:
  turned up edges opposite a bottom surface; and
  a plurality of locators connected to the bottom surface, wherein the plurality of locators is wedged against side surfaces of the group of horizontal supports.

11. The apparatus of claim 1, wherein the internal structure of the aircraft is selected from at least one of a frame, an airframe, a rib, a truss, or a stringer.

12. A hanging scaffold system for attachment to an internal structure of an aircraft, comprising:
  a group of clamping devices configured to be attachable to the internal structure of the aircraft;
  a group of vertical supports connected to the group of clamping devices;
  a group of horizontal supports connected to the group of vertical supports, wherein the group of vertical supports extend perpendicularly from the group of horizontal supports; and
  a group of floorboards supported by the group of horizontal supports;
  wherein a clamping device of the group of clamping devices is attached to each vertical support of the group of vertical supports and each comprises a swing clamp pivotally attached to a pad assembly and is configured to engage an attachment point on the internal structure of the aircraft.

13. The hanging scaffold system of claim 12, wherein a clamping device of the group of clamping devices comprises an attachment face having a curved shape configured to match a contour of the internal structure of the aircraft.

14. The hanging scaffold system of claim 12, wherein both each of the swing clamps and each of the pad assemblies include curved attachment faces and are configured to adjustably attach to a curved attachment point of the attachment point on the internal structure of the aircraft, wherein the curved attachment faces match a contour of the curved attachment point on the internal structure of the aircraft.

15. The hanging scaffold system of claim 12, wherein a group of fitting assemblies connects a horizontal support of the group of horizontal supports to another horizontal support of the group of horizontal supports and pivotally connects each vertical support of the group of vertical supports to the group of horizontal supports.

16. The hanging scaffold system of claim 12, wherein the internal structure of the aircraft is selected from at least one of a frame, an airframe, a rib, a truss, or a stringer.

17. A method for attaching a hanging scaffold system to an internal structure of an aircraft, comprising:
  attaching a group of clamping devices to a curved surface of the internal structure of the aircraft, wherein a clamping device of the group of clamping devices comprises a swing clamp pivotally attached to a pad assembly and is configured to engage an attachment point on the curved surface of the internal structure of the aircraft;
  connecting a group of vertical supports to the group of clamping devices, wherein at least one clamping device of the group of clamping devices is attached to each vertical support of the group of vertical supports;
  connecting a vertical support of the group of vertical supports to another vertical support of the group of vertical supports with a diagonal crossbar;
  connecting a group of horizontal supports to the group of vertical supports on an end of each vertical support of the group of vertical supports opposite the group of clamping devices, wherein the group of vertical supports extend perpendicularly from the group of horizontal supports;
  connecting an outrigger assembly to the group of horizontal supports and further attaching the outrigger assembly to the internal structure of the aircraft; and
  installing a group of floorboards on the group of horizontal supports.

18. The method of claim 17, further comprising:
  installing a group of guardrails into a group of side sockets attached to the group of horizontal supports; and
  connecting a ladder to the group of horizontal supports between two guardrails of the group of guardrails.

19. The method of claim 17, wherein the attaching the group of clamping devices to the curved surface of the internal structure of the aircraft comprises:
  positioning a plurality of curved attachment faces of each of the clamping devices adjacent to the curved surface of the internal structure of the aircraft where a shape of the plurality of curved attachment faces matches a contour of the curved surface of the internal structure of the aircraft; and
  attaching the plurality of curved attachment faces to the internal structure of the aircraft by rotating a tightening device for each attachment face.

20. The method of claim 17, wherein the attaching the group of clamping devices to the curved surface of the internal structure of the aircraft for each of the clamping devices of the group of clamping devices comprises closing the swing clamp over an upper surface of the attachment point of the internal structure of the aircraft and positioning the pad assembly adjacent to a lower surface of the attachment point of the internal structure of the aircraft.

21. An apparatus, comprising:
  a group of horizontal supports to support a group of floorboards;
  a group of vertical supports connected to and extending perpendicularly from the group of horizontal supports;
  a clamping device attached to each vertical support of the group of vertical supports;
  wherein each of the clamping devices is configured to engage an attachment point on an internal structure of an aircraft; and
  wherein at least one floorboard of the group of floorboards comprises:
    turned up edges opposite a bottom surface; and
    a plurality of locators connected to the bottom surface, wherein the plurality of locators is wedged against side surfaces of the group of horizontal supports.

* * * * *